United States Patent
Malecek et al.

(10) Patent No.: US 11,516,250 B2
(45) Date of Patent: *Nov. 29, 2022

(54) LOCAL PORT MANAGING METHOD AND DEVICE, PACKET-ORIENTED DATA NETWORK, DIGITAL STORAGE MEDIA, AND COMPUTER PROGRAM PRODUCT

(71) Applicant: Unify GmbH & Co. KG, Munich (DE)

(72) Inventors: Tomas Malecek, Brno (CZ); Pavel Novotny, Brno (CZ); Martin Plsek, Lelekovice (CZ)

(73) Assignee: Unify GmbH & Co. KG, Munich (DE)

(*) Notice: Subject to any disclaimer, the term of this patent is extended or adjusted under 35 U.S.C. 154(b) by 169 days.

This patent is subject to a terminal disclaimer.

(21) Appl. No.: 17/029,097

(22) Filed: Sep. 23, 2020

(65) Prior Publication Data

US 2021/0014267 A1    Jan. 14, 2021

Related U.S. Application Data

(63) Continuation of application No. 15/231,816, filed on Aug. 9, 2016, now Pat. No. 10,819,740, which is a continuation of application No. 14/373,774, filed as application No. PCT/EP2012/004826 on Nov. 21, 2012, now abandoned.

(51) Int. Cl.
*H04L 9/40* (2022.01)
*H04L 49/25* (2022.01)

(52) U.S. Cl.
CPC .......... *H04L 63/1466* (2013.01); *H04L 49/25* (2013.01); *H04L 63/1441* (2013.01); *H04L 63/162* (2013.01)

(58) Field of Classification Search
CPC ............... H04L 63/1441; H04L 63/162; H04L 63/1466; H04L 49/25
USPC ........................................................ 370/389
See application file for complete search history.

(56) References Cited

U.S. PATENT DOCUMENTS

| | | | |
|---|---|---|---|
| 5,452,348 | A | 9/1995 | Adams et al. |
| 6,597,689 | B1 | 7/2003 | Chiu et al. |
| 6,728,885 | B1 | 4/2004 | Taylor et al. |
| 6,977,930 | B1 | 12/2005 | Epps et al. |
| 8,018,943 | B1 | 9/2011 | Pleshek et al. |
| 8,705,532 | B2 | 4/2014 | Grosser et al. |

(Continued)

FOREIGN PATENT DOCUMENTS

| | | |
|---|---|---|
| CN | 102347895 A | 2/2012 |
| CN | 102487331 A | 6/2012 |
| EP | 1655899 A2 | 5/2006 |

OTHER PUBLICATIONS

Written Opinion of the International Searching Authority for PCT/EP2012/004826 dated Jul. 12, 2013.

(Continued)

*Primary Examiner* — Peter G Solinsky
(74) *Attorney, Agent, or Firm* — Buchanan Ingersoll & Rooney PC

(57) ABSTRACT

A method for managing local ports in a packet-oriented data network is proposed, wherein packets are assigned to a selected local port, and assignment of a local port is controlled based on observation of transmission on the network. The invention also relates to a local port managing device, a packet-oriented data network, a digital storage media, and a computer program product.

20 Claims, 3 Drawing Sheets

(56) References Cited

U.S. PATENT DOCUMENTS

| | | |
|---|---|---|
| 8,761,152 B2 | 6/2014 | Rixner et al. |
| 8,913,489 B2 | 12/2014 | Vinayagam et al. |
| 9,172,662 B2 | 10/2015 | Chang et al. |
| 9,521,079 B2 | 12/2016 | Gooch et al. |
| 10,819,740 B2 * | 10/2020 | Malecek ................. H04L 49/25 |
| 2002/0083351 A1 | 6/2002 | Brabenac |
| 2007/0011321 A1 | 1/2007 | Huntington et al. |
| 2007/0104210 A1 | 5/2007 | Wu et al. |
| 2007/0183416 A1 | 8/2007 | Gooch et al. |
| 2007/0297393 A1 | 12/2007 | Furukawa et al. |
| 2009/0196288 A1 | 8/2009 | Li et al. |
| 2010/0257263 A1 | 10/2010 | Casado et al. |
| 2010/0284404 A1 | 11/2010 | Gopinath et al. |
| 2012/0314605 A1 | 12/2012 | Akiyoshi |

OTHER PUBLICATIONS

International Search Report for PCT/EP2012/004826 dated Jul. 12, 2013.

* cited by examiner

LOCAL PORT MANAGING METHOD AND DEVICE, PACKET-ORIENTED DATA NETWORK, DIGITAL STORAGE MEDIA, AND COMPUTER PROGRAM PRODUCT

CROSS-REFERENCE TO RELATED APPLICATIONS

This application is a continuation of U.S. patent application Ser. No. 15/231,816, which is a continuation of U.S. patent application Ser. No. 14/373,774, which is the United States national phase under 35 U.S.C. § 371 of PCT International Application No. PCT/EP2012/004826, filed Nov. 21, 2012.

BACKGROUND OF THE INVENTION

Field of the Invention

Embodiments relate to methods of managing local ports in a packet-oriented data network. Embodiments also relate to a related local port managing device, a related packet-oriented data network, a related digital storage medium, and a related computer program product.

Background of the Related Art

Minimum delay and smooth data transmission are key factors in real-time communication. Delay and communication power is undesirably increased in a situation where an opened port is loaded by unwanted network traffic. Unwanted data packets may be sent by mistake or because of an intentional attack. A filtering of traffic based on a remote IP address and remote port is not possible in all situations.

Previously, local ports are assigned from a predefined pool without consideration of dynamic aspects. Filtering for reasonable data is done after data reception. It is based on some knowledge about the partner, i.e., e.g., an IP address, port, SSRC (Session SouRCe or Synchronization SouRCe) identifier, or the like. Furthermore, packet filtering is always connected with some performance consumption and with a certain risk of improper decision between wanted and unwanted data.

Another problem is known to occur that payload may be hanging after an improperly closed session. Such hanging payload may also cause undesired packet flooding. In the following, packet flooding may be used as a synonym for any unwanted data traffic.

BRIEF SUMMARY OF THE INVENTION

Embodiments of the invention may alleviate the problems found in the conventional art, as described above. Embodiments may provide, for example, a method, device and network, a data storage medium and a computer program product allowing for local ports being reliably used even if a disturbance by intentional or unintentional packet flooding has occurred. Embodiments may reduce a probability of receiving unwanted data, minimize a risk of disturbance of media transmission, avoid a usage of a port which is threatened by unwanted traffic, and minimize delay in real-time communication.

Embodiments are based on controlling local port assignment based on observation of transmission on the network. Thereby, a method for managing local ports in a packet-oriented data network where packets are assigned to a selected local port can be made adaptive in a sense that packet flooding can be avoided or at least reduced.

Figure 1:
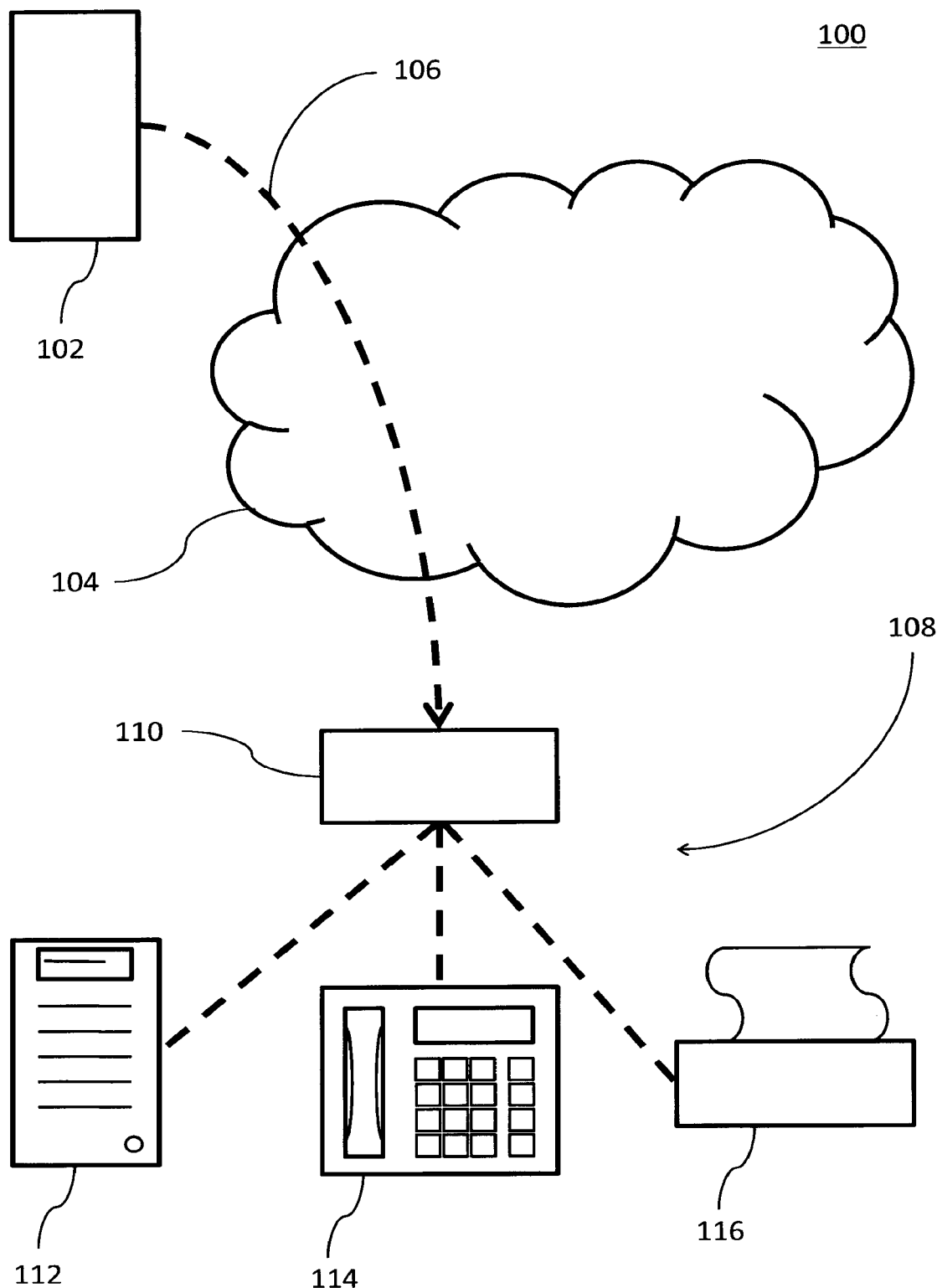
FIG. 1 is a schematic representation of a network according to the present invention.

It will be noted that the figures are strictly schematic and need not to be to scale. Any figurative illustrations and descriptions should be understood to be exemplary, and intended to illustrate the principle of the invention rather than limit the same.

DETAILED DESCRIPTION OF THE INVENTION

In a preferred embodiment of the invention, a local port after being used or a local port which has been detected to be targeted by unwanted data packets is disadvantaged for selection and assignment. This may be realized by disregarding such ports for selection and assignment so that they are not used at all (i.e., if the resource pool is large enough), or used only when no better option exists. In the latter case, a disadvantaged local port may be disregarded for selection and assignment continuously or for a predetermined period of time or as long as unwanted data packet is detected to be addressed to the same. By either one of the afore-mentioned options, the probability of receiving unwanted data decreases accordingly.

In a preferred further development, a queue is defined including local ports for selection and assignment, said local ports being selected and assigned from top to bottom of said queue, wherein said disadvantaged local port is put to a bottom end of said queue. This means that a predetermined or adaptedly defined order for selecting and assigning ports is created. This order may be used for preferring or disadvantaging a port by simply defining its position within the queue. Thus, putting a disadvantaged local port to a bottom end of said queue makes it unlikely that the port receives unwanted packets. In this context, a top of a queue means a position first to be selected.

Alternatively, disadvantaging a port may be accomplished by setting a mark to a port causing this port to be set aside for selection and assignment. This means that this port is virtually taken out of the queue. Different kinds of marks may be used, depending on whether a port is disadvantaged because of a session has ended on this port or a port was targeted by unwanted traffic.

For making it possible that a port once infected by undesired traffic can be used again after a certain amount of time, said disadvantaged local port is allowed to wander through said queue to a top of said queue in the course of time. At a time the port reaches the top end of the queue it is assumed that unwanted packets have become less likely to be still addressed to this port so that the risk of receiving unwanted packets again via this port is reduced.

It may occur that a local port in midst of the queue is directly addressed, by preference or guess or chance, for unwanted packets. If such an attempt is detected, this local port may be shifted to said bottom end of said queue so as to reduce a possibility of this port to actually be activated and receive such unwanted packets. In this environment, a local port once being detected to be addressed by unwanted data packet may be priorised for monitoring for unwanted data packets so that a biasing of ports once infected can be achieved. As the probability of being addressed by unwanted data usually decreases after some time, said priorising may be alleviated in the course of time so as to allow for such biasing to be taken away automatically if an attack has abated.

The invention is also directed to a local port managing device designed and adapted to perform the afore-described method. Thus, an adaptive local port manager may be created.

According to another aspect of the invention, a packet-oriented data network is proposed including such local port managing device. Thereby, traffic in the network can be made faster and connections can be made more reliable.

Further aspects relate also to a digital storage medium with electrically readable control signals which can operate with a programmable computer system, for managing local ports in a packet-oriented data network, said control signals being designed and adapted to cause said computer system to execute the afore-described method, and to a computer program product including program code stored on a machine-readable carrier, for managing local ports in a packet-oriented data network, said program code being designed and adapted to execute the afore-described method if the computer program product runs on a computer.

The afore-mentioned and further features, objects, advantages, and details of the present invention will become even more apparent to those skilled in the art, by studying the following description of preferred embodiments of the invention, and accompanying drawings. Therein, any feature, object, advantage, or detail of any embodiment described or shown will be applicable to any other embodiment and vice versa, unless explicitly described otherwise, or obviously impossible by technical or physical reasons. Embodiments may be combined with each other, and a any combination may also be understood as an embodiment of the invention.

A method of managing local ports is described below as a preferred embodiment of the invention.

FIG. 1 schematically illustrates a network 100 according to the present invention. Network 100 is adapted to transmit packet-oriented data, and therefore is a packet-oriented data network in the sense of the present invention. However, it is not excluded that network 100 or parts thereof is also able to transmit non-packeted data.

In the illustrated situation, an external instance 102 attempts to address, via a wide area network 104 which is part of network 100, a data stream 106 to an instance of a local area network 108 which is also part of network 100. Here, wide area network 104 is the internet, without limiting generality. Local area network 108 is connected to the wide area network 104 by a router 110 which also works as a switch. Router 110 may be implemented in server, or as a stand-alone device. Router 110 is adapted to route and switch data streams to local instances of local area network 108, said local instances being exemplified as a workstation 112, an IP phone 114, and a printer 116 which may, but needs not to, include also functions of a fax, scanner, and/or copier. It will be noted that the depicted local instances 112, 114, 116 stand for a deliberate number of instances of the same or another kind which may be connected with LAN 108.

Each local instance may be addressed by one or more local ports defined and managed by router 110. It will be noted that managing of local ports may be distributed in LAN 108, or may be implemented in another device, e.g., a dedicated server, a further switch, or the like, located somewhere in LAN 108, or any local device 112, 114, 116 may have an ability to manage its own local ports. Herein, without loss of generality, it should be assumed that router 110 manages a list of local ports of LAN 108, as will be described in further detail, in the following.

Figure 2:
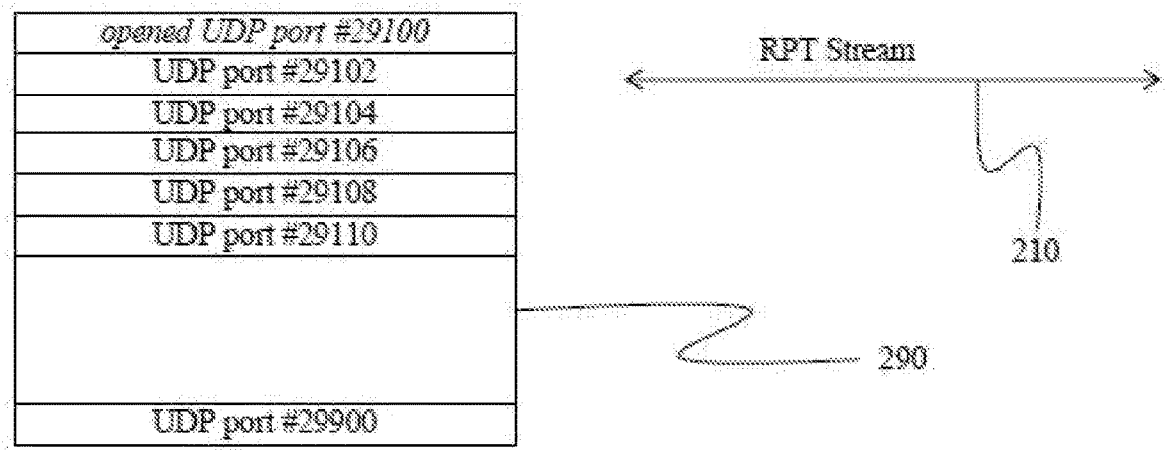
FIG. 2 is a schematic representation of a situation of a local port queue being addressed by a RTP stream.

FIG. 2 schematically depicts a situation where an RTP stream 210 is directed to LAN 108. The local port manager which is implemented by router 110 (see FIG. 1) controls assignment of data packet streams to local ports of the LAN by administrating a local port queue 290 including UDP ports #29100, 29102, . . . , 29900.

As is generally known in the field, RTP stands for Real-time Transport Protocol which is an internet protocol on an application layer, originally defined in RFC 1889 and superseded by RFC 3550 since 2003, while UDP stands for User Datagram Protocol which is an internet protocol on a transport layer, formally defined in RFC 768. By definition, RTP data packets are originated and received on even port numbers, and the associated RTP Control Protocol (RTCP) data are communicated via the respective next higher odd port number.

As UDP port #29100 is the highest of unused local ports in queue 290, UDP port #29100 is assigned by the port manager for RTP stream 210. Here, "high" means a high position in order of selection, in queue 290, wherein smaller port #-numbers depict a higher position in that sense.

Figure 3:
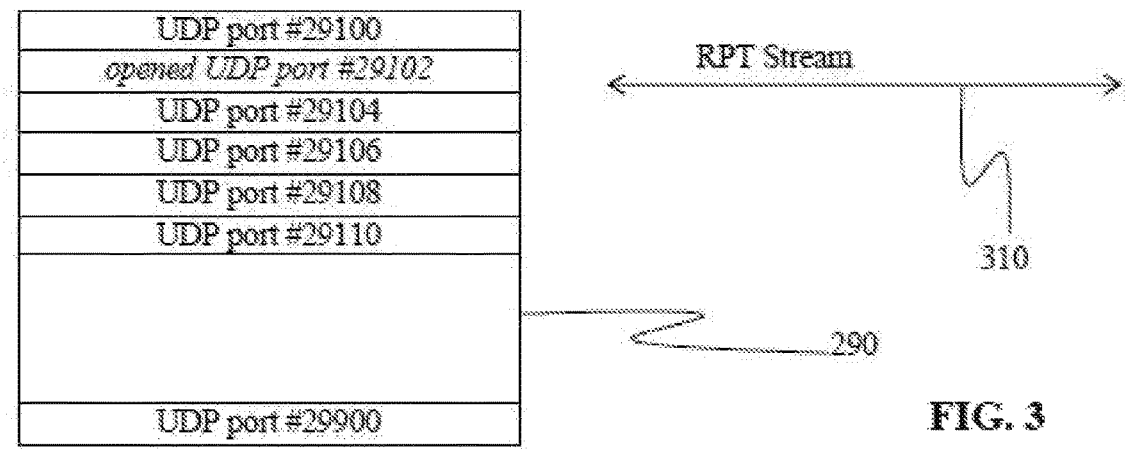
FIG. 3 is a schematic representation of a situation of the local port queue being addressed by another RTP stream.

FIG. 3 schematically depicts a situation where another RTP stream 310 is directed to the port manager. As is shown in FIG. 3, UDP port #29100 is not open any more which means that RTP stream 210 (FIG. 2) has ended, and the assigned session closed. Therefore, UDP port #29100 has been immediately marked as disadvantaged local port by the port manager which means that UDP port #29100 will not be used for further calls in order to prevent the reception of the rest of packets which may still be under way.

As UDP port #29102 is now the highest of unused selectable local ports in queue 290, UDP port #29102 is assigned and opened for RTP stream 310.

Figure 4:
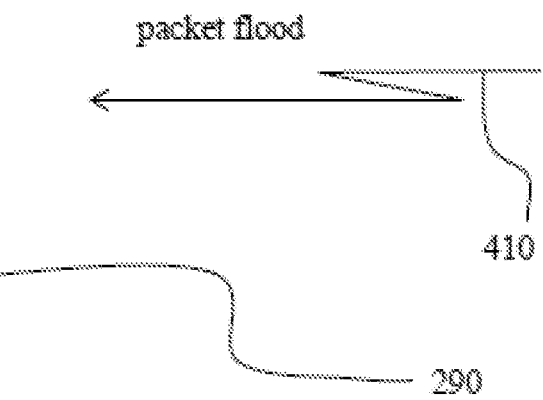
FIG. 4 is a schematic representation of a situation of the local port queue being addressed by a packet flood.

FIG. 4 schematically depicts a situation where a RTP stream which has been detected to be unwanted data packets is directed to the port manager symbolized by packet flood 410. It is assumed that UDP port #29104 may be addressed by packet flood 410 because, e.g., this port was previously opened for unsuspected data communication, and is still open. (It is, however, also conceivable that an unwanted packet flood is directly addressed to a presently closed local port because, e.g., its identifier is known from previous communications or by other reasons.)

As is shown in FIG. 4, UDP port #29102 is not open any more which means that RTP stream 310 (FIG. 3) has ended, and the assigned session closed. Therefore, UDP port #29102 has been marked as disadvantaged local port which means that it is not to be selected for assignment. Furthermore, UDP port #29100 is still marked as disadvantaged local port.

As UDP port #29104 is not blocked at present, any incoming data stream would normally be assigned to UDP port #29104. However, as packet flood 410 was detected to be unwanted, any session currently running via UDP port #29104 will be immediately closed, and UDP port #29104 marked as "dirty", by the port manager. This means that not only UDP port #29104 will be prevented to receive the rest of packets which may still be under way for the closed session but also that any attempt to flood UDP port #29104 again with unwanted data packets will find no target as long as UDP port #29104 is maintained to be marked "dirty".

Figure 5:
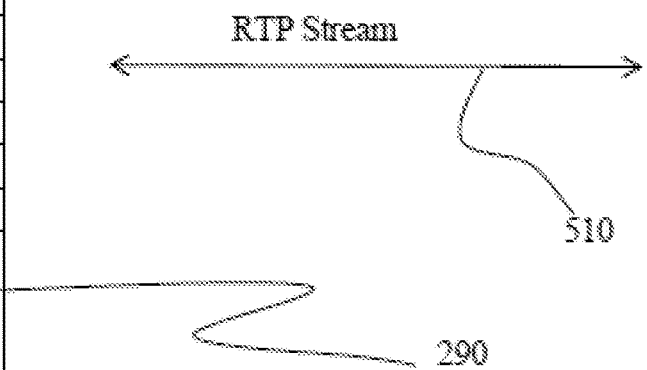
FIG. 5 is a schematic representation of a situation of the local port queue being addressed by a further RTP stream.

FIG. 5 schematically depicts a situation where a further RTP stream 510 is directed to the port manager. As is shown in FIG. 5, UDP ports #29100 and #29102 are still marked as disadvantaged, and UPD port #29104 is still marked as dirty.

As UDP port #29106 is now the highest of unused selectable local ports in queue 290, UDP port #29106 is assigned and opened for RTP stream 510.

Even if not shown in the drawings, after a predetermined period of time, or after reaching UDP port #29900, previously marked local ports may be unmarked so that they can be selected and assigned for communication again.

It should be noted that, while there might be a first stage of being disadvantaged for a port which has just closed its session, a "dirty" mark may be understood to be a further stage of being disadvantaged for a port having experienced some packet flooding. The two stages of being disadvantaged may be treated differently. For example, it may be advantageous when local ports marked "dirty" like UDP port #29104 in the present example, are maintained to be marked for a longer period of time than local ports simply marked "disadvantaged".

In a preferred embodiment which is a variation of the embodiment described above, numbering of ports is dynamically changed in queue 290. I.e., in the example described above, after RTP stream 210 (FIG. 2) has ended, UDP ports #29102, #29104, . . . , #29900 are renumbered to become UDP ports #29100, #29102, . . . , #29898, and the port which was listed as UDP port #29100 is renumbered as UDP port #29900. Likewise, if any UDP port #29xxx has ceased a session, UDP ports #29xxx+2, #29xxx+4, . . . , #29900 are renumbered to become UDP ports #29xxx, #29xxx+2, . . . , #29898, and the former UDP port #29xxx is renumbered as UDP port #29900. The same renumbering may be performed if UDP port #29xxx has any unwanted data packets detected to be addressed thereto. Such renumbering may be understood as a first stage of disadvantaging. Furthermore, in the latter case, a "dirty" mark may be assigned to such port as a second stage of disadvantaging, instructing the port manager to let such port at the bottom end of queue 290 until another "dirty" port occurs which is then sorted in as UDP port #29900 while ports disabled only because unsuspected communication has ended are sorted into queue 290 at a position ahead of any "dirty" ports. It will be noted that, irrespective of whether already marked as "dirty" or not, a port may be sorted to the end of queue 290 if unwanted data packets are detected to be addressed thereto again.

In this embodiment, the port manager selects and assigns the highest unused port for any new RTP stream. By sorting the queue as described, the port having most recently unwanted traffic detected to be addressed thereto will always be the last port being newly selected for assignment.

A "dirty" mark may also instruct the port manager or a communications manager to monitor any so-marked port for unwanted data traffic, with higher priority than other ports.

A "dirty" mark of a port may be cleared only at a time when this port is selected and assigned again. Alternatively, a "dirty" mark of a port may be cleared after a predetermined period of time.

In the adaptive port managing of the present invention, a port is taken from a top end of a queue for establishing a new session, and is sorted to the bottom end of the queue when the session is closed. Packets arriving at a closed port are responded by an IP stack with a message, e.g., "Destination Port Unreachable". By some hook mechanism, a monitor is also informed thereof. If a predetermined limit is exceed (e.g., after three packets), the respective port is shifted to the end of the queue again, and the Procedure starts again. As soon as no further packets arrive any more for a closed port, the port may shift to the top end of the queue in the course of time and is usable again for a session. A disturbed port is repeatedly shifted to the end of the queue and is most probably excluded from being used.

The port manager does not need to monitor a port after closing a session as it is actively informed by the IP stack. The traffic itself is independently detected by the port manager. However, the port manager may be assisted by a Network Intrusion Detection System (e.g., SNORT).

A monitoring for and/or detection of unwanted data packets may by understood as an observation of transmission on the network, in the sense of the invention. Router/switch 110 is a local port managing device in the sense of the invention, while any other device provided separately anywhere in network 100 such as a further switching device or the like in LAN 108 may also be a local port managing device in the sense of the invention, and network 100, wide area network 104, and local area network 108 are packet-oriented data networks in the sense of the invention. Functions of the afore-described method may be incorporated by program steps stored on a memory means installed in router 110 or any other device provided for managing local ports within the network 100 or any subnet thereof. Such program steps may also be provided on a storage medium like a tape or disk, memory stick, semiconductor memory, or the like, online or offline.

The present invention has been exemplified and illustrated by the afore-mentioned embodiments and variations thereof. It will be noted, however, that those embodiments and variations may be further varied and developed by those skilled in the art without leaving the scope of the present invention which is defined by the broadest reading of the appended claims.

For example, while port numbering may be maintained after once being defined, a set of pointers or a placeholder queue may be managed to define an order of selection of ports.

Even if shown and described as a star-type topology, LAN 108 may also be of bus or ring-type topology, or a hybrid form.

It will be noted that the present invention is not only applicable to calls from outside but also to packet flooding attacks from within the LAN 108, e.g., by a trojan having infiltrated the LAN 108.

LIST OF REFERENCE SIGNS AND SYMBOLS

The following list is integral part of the description.

| | |
|---|---|
| 100 | network |
| 102 | external instance |
| 104 | wide area network |
| 106 | data stream |
| 108 | local area network |
| 110 | router/switch |
| 112 | workstation |
| 114 | IP telephone |
| 116 | printer |
| 210 | RTP stream |
| 290 | local port queue |
| 310 | RTP stream |

-continued

| | |
|---|---|
| 410 | packet flood |
| 510 | RTP stream |
| UDP port #29100 | local port |
| UDP port #29102 | local port |
| UDP port #29104 | local port |
| UDP port #29106 | local port |
| UDP port #29108 | local port |
| UDP port #29110 | local port |
| ... | |
| UDP port #29900 | local port |

The invention claimed is:

1. A method for managing local ports in a packet-oriented data network, comprising:
disadvantaging a first local port of the local ports for selection and assignment after the first local port has been used in a communication session to which the first local port was assigned is closed so that the first local port is in a closed state by giving the first local port a first mark, the first mark indicating that the first local port is in a closed state after the communication session ended;
further disadvantaging the first local port in response to detection of the first local port in the closed state being a target of data packet flooding by giving the first local port a second mark, the second mark indicating a local port is the target of data packet flooding; and
placing the disadvantaged first local port at a tail of a queue for the local ports used for selection and assignment of the local ports in response to the first local port having the first mark and being given the second mark such that the first local port be a last port in the queue that is selectable for assignment when the second mark is given to the first local port.

2. The method of claim 1, wherein a head of the queue is a top of the queue and the tail of the queue is a bottom of the queue.

3. The method of claim 1, comprising:
continuously disregarding the disadvantaged first local port for selection and assignment for a predetermined period of time.

4. The method of claim 1, comprising:
disregarding the disadvantaged first local port for selection and assignment as long as data packet flooding is detected at said disadvantaged first local port.

5. The method of claim 1, comprising:
assigning the local ports to data packets based on observation of transmission on the network.

6. The method of claim 1, comprising:
allowing said disadvantaged first local port to shift through the queue to a head of the queue after the disadvantaged first local port is put at the tail of the queue.

7. The method of claim 1, comprising:
placing a second local port of the local ports at the tail of the queue in response to detecting data packet flooding at the second local port.

8. The method of claim 1, comprising:
prioritizing monitoring of the first local port in response to data packet flooding being detected at the first local port.

9. The method of claim 8, comprising:
removing prioritization of monitoring from the first local port after a pre-selected amount of time has passed from the prioritization of the first local port.

10. The method of claim 8, comprising:
removing prioritization of monitoring from the first local port after a pre-selected amount of time has passed from a detection of data packet flooding at the first local port.

11. A local port managing device configured to observe data transmissions on a packet oriented data network and assign data packets received by the local port managing device to a local port based on the observed data packet transmissions by a method comprising:
disadvantaging a first local port of the local ports for selection and assignment after the first local port has been used in a communication session to which the first local port was assigned is closed so that the first local port is in a closed state by giving the first local port a first mark, the first mark indicating that the first local port is in a closed state after the communication session ended;
further disadvantaging the first local port in response to detection of the first local port in the closed state being a target of data packet flooding by giving the first local port a second mark, the second mark indicating a local port is the target of data packet flooding; and
placing the disadvantaged first local port at a tail of a queue for the local ports used for selection and assignment of the local ports in response to the first local port having the first mark and being given the second mark such that the first local port be a last port in the queue that is selectable for assignment when the second mark is given to the first local port.

12. The local port managing device of claim 11, wherein the method also comprises:
continuously disregarding the disadvantaged first local port for selection and assignment for a predetermined period of time.

13. The local port managing device of claim 11, wherein the method also comprises:
disregarding the disadvantaged first local port for selection and assignment as long as data packet flooding is detected at said disadvantaged first local port.

14. The local port managing device of claim 11, wherein the method also comprises:
assigning the local ports to data packets based on observation of transmission on the network.

15. The local port managing device of claim 11, wherein the method also comprises:
allowing said disadvantaged first local port to shift through the queue to the head of the queue after the disadvantaged first local port is put at the tail of the queue.

16. The local port managing device of claim 11, wherein the method also comprises:
placing a second local port of the local ports at the tail of the queue in response to detecting data packet flooding at the second local port.

17. The local port managing device of claim 11, wherein the method also comprises:
prioritizing monitoring of the first local port in response to data packet flooding being detected at the first local port.

18. The local port managing device of claim 17, wherein the method also comprises:
removing prioritization of monitoring from the first local port after a pre-selected amount of time has passed from the prioritization of the first local port or after a pre-selected amount of time has passed from a detection of data packet flooding at the first local port.

19. A packet-oriented data network, comprising the local port managing device of claim 11 and a plurality of terminal devices communicatively connected to the local port managing device.

20. A non-transitory digital storage medium having data stored thereon that defines a method that is performed by a local port managing device that executes the data, the method comprising:
- disadvantaging a first local port of the local ports for selection and assignment after the first local port has been used in a communication session to which the first local port was assigned is closed so that the first local port is in a closed state by giving the first local port a first mark, the first mark indicating that the first local port is in a closed state after the communication session ended;
- further disadvantaging the first local port in response to detection of the first local port in the closed state being a target of data packet flooding by giving the first local port a second mark, the second mark indicating a local port is the target of data packet flooding;
- placing the disadvantaged first local port at a tail of a queue for the local ports used for selection and assignment of the local ports in response to the first local port having the first mark and being given the second mark such that the first local port be a last port in the queue that is selectable for assignment when the second mark is given to the first local port.

* * * * *